3,649,456
SEPARATION OF POLYPEPTIDE SUBSTANCES WITH MACRORETICULAR RESINS
Peter L. de Benneville, Philadelphia, and Heinz W. Blessing, Levittown, Pa., assignors to Rohm and Haas Company, Philadelphia, Pa.
No Drawing. Filed Sept. 8, 1969, Ser. No. 856,176
Int. Cl. C07g 7/02
U.S. Cl. 195—66                                19 Claims

ABSTRACT OF THE DISCLOSURE

Method for the selective separation and recovery of polypeptide substances (e.g. bacterial and fungal exoenzymes, heme pigments, polypeptide hormones) from a biotic fluid (e.g. culture broth, blood serum, urine, sap, extracts of disintegrated cells). Involves contacting the biotic fluid with a macroreticular resin to effect adsorption of the polypeptide, washing the resin with water or salt solution, and then eluting the polypeptide with an aqueous solution of an ionizing substance and a miscible low molecular weight organic solvent. The macroreticular resins employed may be copolymers of divinylbenzene with styrene and ethylvinylbenzene or copolymers of trimethylolpropane trimethylacrylate with trimethylolpropane dimethacrylate.

BACKGROUND OF THE INVENTION

Field of the invention

The present invention relates to a method for the selective separation and recovery of polypeptide substances from a biotic fluid. More particularly, it relates to such a separation method wherein a macroreticular resin is employed.

Brief description of the prior art

Processes for preparing one type of macroreticular resin which may usefully be employed in the method of the present invention are described in U.S. Patents 3,322,-695 to Alfrey et al., 3,147,214 to Kressman et al., 3,326,-875 to Moore and in United Kingdom Patents 932,125 and 932,126. See also U.S. patent application Ser. No. 770,797, filed Oct. 25, 1968 by de Benneville and assigned to the assignee hereof.

Processes for preparing another type of macroreticular resin which may usefully be employed in the method of the present invention are described in U.S. patent application Ser. No. 756,392, filed Aug. 30, 1968 by Albright and assigned to the assignee hereof.

SUMMARY OF THE INVENTION

The method of the present invention comprises the steps of contacting a biotic fluid, from which gross particulate matter has preferably been removed, as by sieving or filtering, with an appropriate amount of macroreticular resin, then desirably washing the resin with water or salt solution, and finally eluting the polypeptide substance with a solution comprising water, an ionizing substance, and a low molecular weight organic solvent which is miscible with the other two components.

By the term "biotic fluid," we mean extracellular fluids which are a part of the living organism or the environment of the living organism. Blood serum, urine, sap, saliva, glandular secretions, gastric juice, and culture media or nutrient broths for growing bacteria, fungi and yeasts, are examples of such extracellular fluids. We also include fluids which are obtained by crushing, macerating, boiling, ultrasonicating or otherwise disintegrating and extracting cells to obtain the water-soluble contents, as is frequently done with leaves or whole plants, seeds, animal organs, glands of animals, bacterial colonies, and fungal or yeast mycelium and spores. Furthermore, we include reaction mixtures which contain polypeptides.

In most cases, the desired polypeptide substance will be present in low concentration in the biotic fluid, which will usually contain cells, spores and detritus which are often difficult to filter or otherwise remove. There will usually be present in solution related small organic molecules, such as amino acids, sugars and polysaccharides, urea, salts, and fatty acids or their salts. The present process brings about the selective removal of polypeptide substances from such fluid mixtures and allows their recovery, frequently in more concentrated form.

The macroreticular resin is used preferably in bead form, ranging from about 100 microns to several millimeters in diameter, for convenience in handling, although smaller beads and powdered resin can be used.

The macroreticular nature of the dry bead may be defined by its surface area, porosity (percent volume of pores) and the pore size distribution. The methods of the art give materials whose surface areas range from 5 to 1000 square meters per gram, whose porosity ranges from 10 to about 75 volume percent, and whose pore diameters range from 0.001 to 1 micron. In general, we have found that any material whose surface area is above 10 square meters per gram, whose porosity is above 35%, and whose pore diameters are primarily in range of 0.01 to 1 micron will adsorb appreciable amounts of polypeptide for use in accordance with the present invention.

For use as adsorbent in aqueous solutions, the beads should be used wet, particularly if they are of aromatic polymers. This is readily accomplished by soaking the bead in a water-miscible organic solvent, for example methanol, ethanol, acetic acid, acetone, dioxane, or glycol, and then displacing the solvent with water. The wet beads are then ready for use.

All of the beads falling within the above definition will be useful, but we have noticed that in the case of our most efficient beads, particularly for large molecules, the bead undergoes a volume expansion of 50% or more over the original size of the dry bead in methanol, and that 90% of this expansion is retained when the methanol is displaced by water. This means that the surface area and pore size are proportionately increased over that of the dry bead. This expansion is therefore a preferred characteristic of the polymer. Resins of this type have good bead stability and show high adsorptive power.

Chemically, two types of resins have been found useful in the present separation method: (1) copolymers of divinylbenzene with styrene and ethylvinylbenzene and (2) copolymers of trimethylolpropane trimethacrylate and trimethylolpropane dimethacrylate.

The broad definition of divinylbenzene copolymers is meant to include copolymers of divinylbenzene with added styrene, polymers of commercial divinylbenzene, which is 60% divinylbenzene and 40% ethylvinylbenzene, up to polymers of purified divinylbenzene, which is 96% divinylbenzene and 4% ethylvinylbenzene.

Similarly, the copolymers of trimethylolpropane trimethacrylate and trimethylolpropane dimethacrylate with acrylic and methacrylic esters are meant to be included, as well as pentaerythritol tetramethacrylate polymers.

The particularly preferred class of macroreticular resin for use in the present invention can be defined as a crosslinked polymer or resin base which has a surface area above about 200 square meters per gram, porosity greater than 40%, and pore diameters primarily within the range of 0.01 to 1 micron, and which shows greater than 50% volume expansion in methanol, which comprises either (1) about 30% or more of divinylbenzene units along with ethylvinylbenzene and styrene units, or
(2) about 90% or more trimethylolpropane trimethacrylate units along with trimethylolpropane dimethacrylate.

According to the present invention, the biotic fluid may be brought into contact with the macroreticular resin in any convenient manner. For example, the resin may be packed in a chromatographic column and the fluid permitted to percolate through it; alternatively the resin may be immersed in a volume of fluid and then removed as by filtration or centrifugation.

Once adsorbed, only small amounts of the polypeptide are removed by extended water wash, or by washes with salt solutions or buffer solutions, as used for elution in the prior art with some other varieties of adsorbents. Likewise, washing with lower alcohols or alcohol-water combinations generally removes only a minor portion of the adsorbed polypeptide.

It is to be recognized that biologically active polypeptides, i.e. enzymes, will have varying stability when adsorbed on the resin, and that some may suffer changes, particularly in their tertiary structure, which may lead to denaturation. For example, the combination of α-amylase with a divinylbenzene-type resin may be dried under vacuum and after storage for a long time may be eluted with essentially total recovery of the enzymatic activity. However, if it is allowed to stand under water, appreciable denaturation is noted after one day.

The activity may, however, be preserved without change by maintaining the resin under salt solution. It will frequently be desirable, therefore, although not always necessary, to wash the resin after adsorption has been effected with salt solutions of low concentration, for example 1–5% sodium chloride, rather than with pure water to remove the original biotic environment. These wash solutions may be neutral, or desirably, at a pH approximating the isoelectric point of the polypeptide. Similarly, stability is favored by the use of low temperatures, below about 10° C., in the adsorption process. Smaller peptides, which do not have significant tertiary structure, can usually be recoverd without change.

To recover the polypeptide from the macroreticular adsorbent, we have found that a particular type of eluent is required. In accordance with the present invention, the eluent is a solution of a salt in water and a water-miscible organic solvent.

We have found that water alone or aqueous solutions of salts or buffers effect practically no elution of adsorbed polypeptides. A solution of 50% water and 50% methanol elutes only a very minor amount, generally less than 5%, of the adsorbed polypeptide; and pure methanol or 20% methanol elute essentially none. Thus, the eluent mixture as defined herein is seen to exert a highly specific and entirely unexpected effect.

In general, any ionizable salt or buffer which is soluble in the chosen water-organic solvent system may be used in the eluent solution. Soluble salts of the alkali or alkaline-earth metals, for example, halides, particularly chlorides, sulfates, phosphates, acetates, and citrates may be used. Quaternary ammonium salts, particularly the halides, may also be used. Satisfactory recovery of protein may be obtained using the following salts, for example: LiCl, NaCl, $CaCl_2$, KCl, $Na_3PO_4$, $KH_2PO_4$, $Na_2HPO_4$, $Na_2SO_4$, benzyltriethylammonium chloride, octylphenoxyethoxyethyldimethylammonium chloride, sodium acetate, and sodium citrate.

It will be recognized that particular cations or anions will sometimes contribute to denaturation of large proteins such as enzymes. This is particularly true of high molecular weight quaternary ions. Thus, the choice of salt in each instance will depend on the polypeptide to be separated and on the degree to which it is desired to retain biochemical activity.

Since it is usually desirable to remove the organic solvent after the elution, the most useful water-miscible solvents are the lower alcohols (methanol, ethanol, 1-propanol and 2-propanol) and acetone. In addition, such solvents as acetonitrile, nitromethane, or ethylene glycol may also be useful in specialized applications.

It is evident that the most favorable conditions for a particular separation will depend on the chemical nature of the resin, polypeptide, solvent, and salt, but in general the concentration of salt may range from about 0.02 molar to 2 molar, and the relative volume or organic solvent may be from about 25% to 70% of the solution.

The amount of a given salt which can be dissolved is of course a function of the particular organic solvent which has been chosen and its ratio to water in the mixed solvent. In general, higher concentrations of the salt are preferred, even though this requires using a lower concentration of organic solvent, since a sharper elution pattern is obtained.

A solution of 50% organic solvent in water, 0.1 to 1 molar in a given salt will usually effect the elution of most proteins. If the salt has a polyvalent anion, as is the case with phosphate buffer mixtures, it is usually sufficient to use from 0.03 to 0.07 molar concentration, owing to the higher ionic strength.

When high amounts of organic solvent are used, it is well to ascertain if the protein is soluble in the mixture, if it is available in pure form. On the other hand, low concentrations of organic solvent slow down the elution and exacerbate the problem of instability of the tertiary structure, which is vital to the activity of the protein.

Of the various organic solvents, methanol, for example, gives good recovery over a wide concentration range. The less polar solvents such as ethanol and 2-propanol, however, are more desirably employed in concentrations below about 60%. Preferably, the amount of solvent may range from about 40% to 55% by volume.

PREPARATION OF MACRORETICULAR RESINS

The various resins prepared as follows have been found highly useful in the process of the present invention.

Resin A

A mixture of styrene (35 g.), technical divinylbenzene (35 g.), deodorized kerosene (104 g.), toluene (55 g.), and benzoyl peroxide (1.5 g.) was charged to a solution of sodium chloride (8.8 g.), Amberlite W–1 (ammonium salt of styrene/maleic anhydride copolymer Rohm and Haas Co., Philadelphia) (5.1 g.), sodium bicarbonate (1.4 g.), and gelatin (0.06 g.) in 250 g. water. The mixture was agitated until the organic phase was dispersed as fine droplets and then heated at 80° C. for five hours.

The mixture of liquids was sucked off from the resulting polymer pearls, which were then washed copiously with methanol, until addition of the wash to water showed no turbidity. They were then air-dried to give 59 g. of white, opaque spherical beads, were then screened to give suitable mesh sizes, in the range of 20–100 mesh.

Resin B

The following oil phase and water phase mixtures were made up and charged to a three-liter flask:

Oil phase:
  Divinylbenzene, redistilled tech. (60% divinylbenzene, 40% ethylstyrene)—122.5 g.
  Styrene—122.5 g.
  Deodorized kerosene—364 g.
  o-Dichlorobenzene—361 g.
  Benzoyl peroxide—5.25 g.
Water phase:
  Deionized water—875 ml.
  Sodium chloride—30.8 g.
  Sodium bicarbonate—4.9 g.
  Amberlite W–1—17.85 g.
  Gelatin, Knox edible—0.21 g.

A blade stirrer was used at 175 r.p.m. The mixture was brought to a uniform suspension, and was then heated for 16 hours at 80° C. The resulting polymer beads were washed four times with one liter of deionized water, three times with one liter of ethanol (denatured 2B) and three times with one liter of toluene. The beads were transferred into a chromotographic column and washed with methanol until they were free of toluene. The excess methanol was sucked off, and the beads were refluxed with a solution of 50 g. of KOH in 1.4 liters ethanol for 7 hr. They were washed free of KOH in the column with ethanol, and air dried. They were screened to give the following cuts: >18 mesh, 21.7 g.; 18–50 mesh, 158.7 g.; >50 mesh, 56.4 g.

Resin C

A homogeneous solution was prepared in a 12-l. flask from 6000 g. water, 180 g. NaCl, 6 g. gelatin and 72 g. of a 12.5 wt. percent aqueous solution of sodium polyacrylate. The pH of the solution was adjusted to 8 to 9 with concentrated aqueous ammonia. A mixture of 900 g. commercial trimethylolpropane trimethacrylate with 9 g. lauroyl peroxide and 2100 g. toluene was introduced into the reactor. (The commercial trimethylolpropane trimethacrylate was found by gas-liquid chromatography to be 92% triester and 8% diester, i.e. trimethylolpropane dimethacrylate.) The dispersion of organic liquid in an aqueous phase was prepared at ambient temperature at 80 r.p.m. with on-off agitation cycles until only droplet and aqueous phases remained in the absence of stirring. Formation of the dispersion required approximately fifteen minutes. The droplets were polymerized under nitrogen at 65° C. for 20 hr. into solid opaque spheres, washed and dried. The yield of dried copolymer was 896 g. or 99.5% of theory.

Resin D

In the preparation of Resins A and B, a mixed aliphatic and aromatic solvent system was employed. The solvent for the Resin A preparation was deodorized kerosene and toluene; for Resin B it was deodorized kerosene and o-dichlorobenzene. The Resin D series, on the other hand, was prepared with a single organic solvent, 4-methyl-2-pentanol. The amount of divinylbenzene and of solvent is expressed as a percentage of the total monomer employed.

TABLE I.—CHARACTERISTICS OF RESINS A, B AND C

| Resin | Surface area (m.²/g.) | Porosity (vol. percent) | Pore size distribution (percent) | | | Bulk volume, 1 g. of resin (ml.) | | |
|---|---|---|---|---|---|---|---|---|
| | | | Below 0.01 micron | 0.01–0.1 micron | 0.1–1.0 micron | In air | In methanol | In water |
| A | 270 | 60 | 16 | 48 | 36 | 4.0 | 6.3 | 5.4 |
| B | 500 | 43 | 12 | 79 | 9 | 2.85 | 5.75 | 4.9 |
| C | 450 | 55 | 19 | 76 | 5 | 3.0 | 5.9 | 5.4 |

TABLE II.—PREPARATION AND CHARACTERISTICS OF D-SERIES DIVINYLBENZENE RESINS

| Resin | Divinylbenzene (percent) | Solvent (percent) | Surface (m.²/g.) | Area porosity (vol. percent) |
|---|---|---|---|---|
| D–1 | 10 | 45 | 16 | 47 |
| D–2 | 20 | 45 | 52 | 52 |
| D–3 | 30 | 45 | 53 | 57 |
| D–4 | 50 | 33 | 340 | 40 |
| D–5 | 50 | 40 | 209 | 53 |

EXAMPLE 1

The α-amylase enzyme elaborated by *Bacillus subtilis* serves as an excellent active principle for adsorption tests, since it has outstanding stability to a variety of environmental conditions, particularly temperature. The biotic fluid we employed was the filtrate of a diastase fermentation broth prepared generally in accordance with the teachings of U.S. Pat. 2,530,210. This product, in stabilized form and standardized activity, is commercially available from Rohm and Haas Co., Philadelphia, as Rhozyme GC Extra.

The crude culture filtrate is a stable brown solution which, in addition to α-amylase, contains at least two proteases, other proteins, carbohydrates, aminoacids, polypeptides, and salts from the nutrient medium. Solids content is about 10%.

The enzymatic activity of α-amylase is determined by measuring the decrease in viscosity of a gelatinized potato starch solution at pH 6.7 after 0.1–0.3 hr. incubation at 70° C. The activity is expressed in FM Units, also designated Rhofon Units. This test is further described in "Test Methods for Determining Diastatic Activity" (Booklet No. T–40A, Rohm and Haas Co., Philadelphia). The biotic fluid employed in this example had an activity of 9,000 FM Units per ml.

The equilibrium capacity of α-amylase on each of the resins was determined. First, the polymer beads were preconditioned by soaking in methanol for about 30 minutes, and then replacing the methanol by chlorine-free water. The beads were then contacted with the diastase filtrate and allowed to come into equilibrium with it. The amount of enzyme adsorbed was then determined, with the results given in Table III.

TABLE III

Adsorption of α-amylase on various divinylbenzene polymers

| Resin: | Adsorption (FM units/gram resin) |
|---|---|
| A | 166,300 |
| B | 300,000 |
| C | 150,000 |
| D–1 | 34,600 |
| D–2 | 19,600 |
| D–3 | 44,800 |
| D–4 | 19,200 |
| D–5 | 31,400 |

The data show that all of these resins, which fall into our general definition, any vary widely in characteristics, adsorb substantial amounts of the enzyme α-amylase, which is a large molecule of about molecular weight 100,000. Crystalline α-amylase, prepared by the methods of the literature, was found to assay at 3,100 FM Units per mg. of protein. This means that at equilibrium, with one g. of D-series resin (dry basis) from 6 to 15 mg. of amylase is adsorbed, and with our preferred class (Resins A, B and C) from 50 to 100 mg. is adsorbed, showing an order of magnitude difference.

Although these data were obtained using a filtered *B. subtilis* diastase culture broth, the unfiltered medium containing bacteria, spores, and nutrient debris can be used just as well, and in fact this process serves to very much simplify the recovery of exoenzymes of this type, as well as to concentrate them.

Once adsorbed, only small amounts of the enzyme were removed by extended water wash, or by washes with salt solutions or buffer solutions, as used for elution in the prior art with some other varieties of adsorbents. Likewise, washing with lower alcohols or alcohol-water combinations removed only a minor portion of the enzyme.

EXAMPLE 2

Twenty ml. of the *B. subtilis* fermentation broth filtrate was stirred for two hours with one g. of Resin A, preconditioned as in Example 1. The beads were removed by filtration and washed with chlorine-free water. Evaluation of the filtrate and washes for α-amylase activity and protein content showed by difference that the resin had adsorbed about 280 mg. of protein, and 144,000 FM Units of activity.

The wet polymer was placed in a column of about one cm. inside diameter, and an eluting agent composed of 1 part of methanol and one part of 0.2 M sodium chloride solution was added, maintaining feed and drainage in such a way as to keep at least one bed volume of eluent on the column. One hundred ml. was passed through the column in a two-hour period. The effluent was then analyzed for protein by the biuret method [Methods in Enzymology, V. 3, p. 450 (Academic Press, 1957)], and for amylase activity. It was found to have about 140,000 FM Units of activity, and 160 mg. of protein.

A solids determination on the original diastase filtrate showed that about 2 g. of non-volatile material (protein, amino acids, salts, carbohydrates) was present in the 20 ml. used. A solids determination on the eluted $a$-amylase enzyme showed less than 200 mg. of solids in addition to the salt used in the eluent. The remaining 1.8 g. of non-volatiles was found in the effluent of the original water washes.

This illustrates that the enzyme is selectively adsorbed on the resin, and can be recovered from it almost quantitatively.

ml. fraction was analyzed for protein and for amylase activity, with the results given in Table IV.

TABLE IV.—ELUTION OF α-AMYLASE WITH 0.03 M NaCl IN 50% METHANOL

| Fraction | FM units | Mg. protein | Specific activity (FM units/mg. protein) |
|---|---|---|---|
| Original DF | 172,000 | 510 | 340 |
| Fraction 1 | 15,000 | 80 | 190 |
| Fraction 2 | 60,500 | 40 | 1,510 |
| Fraction 3 | 19,600 | 14.5 | 1,350 |
| Fraction 4 | 12,380 | 9.5 | 1,305 |
| Fraction 5 | 6,650 | 7.0 | 950 |

Table IV shows that a four to five-fold purification of the enzyme in terms of total biuret-determinable protein can be effected with good total recovery, and without undue dilution. The eluate may be stripped of methanol by the use of vacuum at room temperature to yield a stable enzyme solution.

EXAMPLE 5

Resin A was loaded with *B. subtilis* α-amylase enzyme as in Example 2. (Note, however, that in Run 17, a different resin was employed, and in Run 16, unfiltered culture broth was used.) Table V reports the results obtained using various water-solvent-salt eluent solutions.

TABLE V.—ELUTION OF α-AMYLASE WITH VARIOUS ELUENTS

| | Eluent mixture | | | | | Activity (FM units) | | Protein (mg.)[a] | |
|---|---|---|---|---|---|---|---|---|---|
| Run | Volume (ml.) | Solvent | Percent | Salt | Molarity | Resin (g.) | Loaded | Eluted | Loaded | Eluted |
| 1 | 50 | CH₃OH | 50 | NaCl | 1.9 | 1 | 84,000 | 81,000 | | |
| 2 | 50 | CH₃OH | 70 | Na acetate | 1.0 | 1 | 132,000 | 120,150 | 258 | 116 |
| 3 | 80 | CH₃OH | 50 | Na₂SO₄ | 0.07 | 1 | 116,800 | 103,000 | 260 | 180 |
| 4 | 90 | CH₃OH | 70 | Na acetate | 2.0 | 1 | 125,300 | 98,300 | 260 | 210 |
| 5 | 50 | CH₃OH | 50 | CaCl₂ | 0.94 | 1 | 137,400 | 98,070 | 258 | 185 |
| 6 | 100 | CH₃OH | 50 | KCl | 1.0 | 1 | 159,900 | 157,000 | 285 | 175 |
| 7 | 94 | CH₃OH | 50 | NaCl | 0.03 | 1 | 155,950 | 124,000 | 260 | 157 |
| 8 | 90 | CH₃OH | 50 | CaCl₂ | 0.1 | 1 | 161,250 | 111,000 | 285 | 212 |
| 9 | 73 | CH₃OH | 50 | Hyamine 1622 [b] | 0.022 | 1 | 134,600 | 102,000 | | |
| 10 | 75 | CH₃OH | 50 | BTEAC [c] | 0.044 | 1 | 146,800 | 129,500 | | |
| 11 | 100 | C₂H₅OH | 50 | Sorenson [d] | 0.033 | 0.5 | 65,000 | 66,000 | | |
| 12 | 100 | CH₃OH | 50 | Sorenson [d] | 0.033 | 0.5 | 56,900 | [e] 43,600 | 81 | 80 |
| 13 | 12 | C₂H₅OH | 70 | NaCl | 0.54 | 1 | 76,200 | 54,000 | | |
| 14 | 102 | C₂H₅OH | 50 | NaCl | 1.0 | 10 | 1,040,000 | 985,000 | | |
| 15 | 8 | i-C₃H₇OH | 70 | NaCl | 0.9 | 1 | 76,200 | 38,000 | | |
| 16 | 50 | CH₃OH | 70 | Na citrate | 0.03 | 1 | 69,100 | [f] 40,150 | | |
| 17 [g] | 10 | CH₃COCH | 50 | Sorenson [d] | 0.033 | [h] 2 | 10,700 | 9,000 | | |

[a] By biuret method.
[b] Hyamine 1622 is octylphenoxyethoxyethyl dimethylammonium chloride, a product of Rohm and Haas Co., Philadelphia.
[c] BTEAC is benzyltriethylammonium chloride.
[d] Sorenson's buffer is Na₂HPO₄ and KH₂PO₄, each made up ⅕ molar, mixed 60:40, and adjusted to pH 8 with NaOH. It was mixed in the appropriate proportions with organic solvent.
[e] 74% of *B. Subtilis* protease adsorbed was also recovered.
[f] Unfiltered diastase broth was used.
[g] The resin was a polymer containing 3% divinylbenzene, 2% ethylstyrene, and 95% styrene, with about 10 m.²/g. surface area and 67% porosity.
[h] Milliliters of wet resin.

EXAMPLE 3

One g. of Resin A was loaded with 86,000 FM Units of α-amylase activity, as in Example 2. The resin was then dried by placing it in a rotary evaporator and removing the water under high vacuum. It was then allowed to stand at room temperature. After ten days, it was placed in a column and eluted using a 70% methanol solution, 0.067 molar in NaCl. We recovered 84,000 FM Units of activity, or 98% of the original. This shows that enzyme on the resin remained stable, and did not lose its effective configuration.

EXAMPLE 4

One g. of Resin A, preconditioned as in Example 1, was stirred for 2 hr. with 20 ml. of diastase filtrate which contained 172,000 FM Units of α-amylase activity and 510 mg. of protein (by biuret determination). The resin was transferred to a column and washed with water. The water washes were combined with the recovered diastase filtrate, into a fraction called Unabsorbed DF. It had 28,000 FM Units of activity and contained 230 mg. of protein. The column then contained 280 mg. of protein and 144,000 FM Units of activity. It was eluted at room temperature with 50% methanol, 0.03 molar in NaCl, and each 10-

The data of Table V show that the addition of only small amounts of a wide variety of salts, as earlier defined, to the aqueous-organic solvent gives high recoveries of active enzyme. In contrast to this, we have found that water and aqueous solutions of salts or buffers effect no elution of enzyme. A 50% methanol solution without salt eluted only 3% of the enzyme activity, and pure methanol or 20% methanol eluted essentially none. The eluent mixture as defined therefore exerts a highly specific and entirely unexpected effect.

EXAMPLE 6

A column 7.9 cm. in diameter and 120 cm. high was filled with 3,820 ml. (660–700 g.) of beads of Resin B, which had previously been pre-soaked in anhydrous ethanol (denatured 2B). The beads were washed with water, and the water level was adjusted to the top of the column. Unfiltered bacterial diastase broth from *Bacillus subtilis*, assaying at 24,700 FM Units per g., was passed through the column at the rate of about 80 ml. per minute, until 3500 g. had been loaded. Water (7,000 g.) was then passed through the column at the rate of 150–200 ml. per minute, and then 11,000 g. more water was passed through to ensure complete washing Effluent was collected. The total effluent contained 3,620,000 FM Units, almost all in the first 7,000 g. water wash, leaving adsorbed on the column 82,830,000 FM Units of activity.

Eluent composed of 50% anhydrous ethanol (denatured 2B) in water, containing 5.66% NaCl, was then passed through the column at room temperature at the rate of 120–130 ml. per minute, and fractions were collected, approximately every 1,000 g. of eluent. Analysis of these fractions for activity gave the recovery values shown in Table VI.

TABLE VI.—ROOM TEMPERATURE ELUTION OF α-AMYLASE

| Eluate fraction | Weight (g.) | FM units, total | FM units, per g. | Percent of amount adsorbed |
| --- | --- | --- | --- | --- |
| 1 | 988 | 0 | 0 | 0 |
| 2 | 999 | 415,000 | 415 | 0.5 |
| 3 | 993 | 38,150,000 | 38,400 | 46 |
| 4 | 987 | 20,000,000 | 20,300 | 24 |
| 5 | 1,068 | 9,725,000 | 9,100 | 12 |
| 6 | 1,181 | 5,200,000 | 4,400 | 6 |
| 7 | 992 | 2,340,000 | 2,350 | 3 |
| 8 | 1,007 | 1,460,150 | 1,450 | 2 |
| 9 | 1,117 | 1,072,320 | 960 | 1 |
| 10 | 976 | 635,000 | 650 | 0.8 |
| Totals | 10,308 | 78,997,470 | | 95.5 |

After ethanol was stripped from Fraction 3, the fraction contained 76,000 FM Units per gram, a concentration of three times the activity level of the broth loaded on the column.

Ten ml. of a similar eluate containing 16,400 FM Units of activity per g. was cooled, 15 ml. of cold ethanol (2B) and 0.1 g. of cornstarch were added, and the mixture was allowed to settle for 10 minutes. The precipitated enzyme was filtered to yield 125.3 mg. of dry powder which had an activity of 950 FM Units per mg. This is to be compared with about 3,000 FM Units per mg. for crystalline α-amylase. Eluates were free of cells, spores and byproduct carbohydrates and amino acids.

An even sharper pattern of elution was obtained when it was carried out at elevated temperature, about 40°. The elution of this enzyme is relatively insensitive to pH and may be carried out between pH 6 and 9 with no substantial differences.

EXAMPLE 7

We have found that fungal protease from *Aspergillus oryzae* [Bergkvist, Acta Chem. Scand., 17, 1521 (1963)] is sensitive to the eluent systems of the present invention. Although recovery of protein on elution with a mixture of 50% methanol and 50% Sorenson's buffer (pH 8) was practically quantitative, recovery of activity was less than 20%. However, this example illustrates that when the elution was carried out at 0–5°, much more of the activity placed on the column was recovered in the eluate.

After preconditioning, one g. of Resin A (50–100 mesh) was stirred with 20 ml. of a solution containing 500 mg. of *Aspergillus oryzae* protease (430 mg. protein) for one hr. The suspension of beads was transferred to a small chromatographic column, on which it was washed with water (50 ml.) at 0° C. Evaluation of the wash water showed that 278 mg. of fungal protease (262 mg. protein) had been adsorbed. The column was surrounded with a jacket through which ice water was circulated to keep the temperature at 0–5°. The enzyme was eluted with an ice-cold mixture of methanol (50%) and Sorenson's buffer, pH 8 (50%). The eluate was collected (50 ml.) and by gelatine viscosity measurement and biuret protein determination was found to contain about 200 mg. of the fungal protease, 74% of the original activity.

We have also found that another method of improving the stability towards elution is to use less organic solvent (e.g. 1 M LiCl in 25% methanol), but elution was slower, and recovery was not as good.

EXAMPLE 8

A 20-g. portion of Resin B (50–100 mesh) was preconditioned by soaking in ethanol (2B) and then washing with tap water. The resin was then placed in a column approx. 2.5 cm. in diameter.

One liter of a filtered *Bacillus subtilis* culture broth adjusted to pH 5.85 was passed through the resin at the rate of 5–6 ml. per minute. The broth had been prepared along the lines of Netherlands Pat. 6,707,740 and contained as active principle the alkaline bacterial protease described by De Lange et al., J. Biol. Chem., 243, 2134 (1968). Its activity was determined by the increase in chromophores soluble in trichloroacetic acid upon the treatment of azocasein with the enzyme at pH 8.5 for 20 minutes at 40° C. The liter of culture broth contained 14,550,000 Activity Units of protease.

The column was then washed with 850 ml. of water at the rate of 8 ml. per minute. Analysis of the effluent and washings showed that 97% of the proteolytic activity had been adsorbed on the resin.

The column was then eluted with a solution adjusted to pH 9.5 with ammonia, containing 2.8% NaCl in a one-to-one mixture of ethanol and water, passing through at 5–6 ml. per minute, with the results shown in Table VII.

TABLE VII.—ELUTION OF ALKALINE BACTERIAL PROTEASE

| Eluate fraction | Volume (ml.) | Activity units, total | Activity units per g. | Percent of amount adsorbed |
| --- | --- | --- | --- | --- |
| 1 | 22 | 3,190,000 | 145,000 | 22.5 |
| 2 | 23 | 4,600,000 | 200,000 | 32.5 |
| 3 | 22 | 2,508,000 | 114,000 | 17.8 |
| 4 | 31 | 1,410,500 | 45,500 | 10.0 |
| 5 | 31 | 446,400 | 14,400 | 3.2 |
| 6 | 40 | 88,000 | 2,200 | 0.6 |
| 7 | 100 | 25,000 | 250 | 0.2 |
| Totals | 269 | 12,267,900 | | 86.8 |

It is to be noted that eluate fractions 1 to 6, amounting to 169 ml., contained 86.6% of the protease activity adsorbed. Thus, a concentration of about five times was achieved, even before alcohol was removed, and extraneous matter was absent from the product.

EXAMPLE 9

A column was prepared from 10 g. of Resin C, and 550 ml. (12,650,000 Activity Units) of the filtered *B. subtilis* culture broth of Example 8 was passed through at the rate of about 2 ml. per minute. The column was washed with about 262 ml. of water. Analysis of the effluent and washings showed that 72% of the proteolytic activity had been absorbed on the resin.

The column was then eluted with the eluent employed in Example 8, with the result shown in Table VIII.

TABLE VIII.—ELUTION OF ALKALINE BACTERIAL PROTEASE

| Eluate fraction | Volume (ml.) | Activity units, total | Activity units per g. | Percent of amount adsorbed |
| --- | --- | --- | --- | --- |
| 1 | 18 | 875,000 | 48,700 | 9.5 |
| 2 | 20 | 3,800,000 | 191,000 | 41.4 |
| 3 | 21 | 2,500,000 | 118,000 | 27.3 |
| 4 | 21 | 880,000 | 42,200 | 9.6 |
| 5 | 20 | 280,000 | 14,000 | 3.0 |
| 6 | 20 | 88,000 | 4,400 | 1.0 |
| 7 | 55 | 83,000 | 1,510 | 0.9 |
| Totals | 175 | 8,506,000 | | 92.7 |

EXAMPLE 10

Pepsin, the major protease found in the stomach (MW 35,000, pI less than 1) is characterized by UV absorption at 278 mμ, which can be used to follow the adsorption and desorption.

A solution of pepsin (400 mg.) in McIlvaine buffer, pH 3.5 (50 ml.), was contacted with 1 g. of Resin B for 7 hr., with agitation. The adsorbed material, corresponding to 300 mg. (397 AU), was eluted with 1-to-1 aqueous ethanol, containing 5.5% NaCl. The eluent contained 192 mg. of pepsin (238 AU), or 64% of the adsorbed material.

EXAMPLE 11

Gamma-Chymotrypsin (MW 24,000, pI 8), a pancreatic protease, was placed on Resin B (1 gram) and on Resin C (1 gram). Assays were carried out by the biuret protein method using bovine albumin as a standard. Each resin adsorbed about 150 mg. (in terms of bovine albumin). Two eluents were employed: 1-to-1 aqueous ethanol containing 5.5% NaCl; and 50% aqueous ethanol, 0.0054 normal HCl, 4.56% NaCl. Chymotrypsin was not soluble in the first eluent but was soluble in the second. In each case, small amounts of the enzyme were eluted. By varying the composition of the eluent as disclosed hereinabove, greater amounts of adsorbed material may be recovered.

EXAMPLE 12

Snake venom phosphatase hydrolyzes nucleoside-5'-phosphates to the corresponding nucleosides. Using the biuret assay, it was found that 50 mg. of Resin B adsorbed 5.2 mg. of this phosphatase. Elution with 1-to-1 aqueous ethanol containing 5.5% NaCl gave a recovery of 52% of the phosphatase adsorbed.

EXAMPLE 13

Gelatine (partially hydrolyzed collagen) and two blood proteins, serum albumin (MW 70,000, pI 4.7) and gamma-globulin (MW 150,000), were also studied using 1 g. of Resin B by the method used in Example 10.

About 50 mg. of gelatin was adsorbed; 162 mg. of serum albumin was adsorbed; and 135 mg. of gamma-globulin was adsorbed.

Recovery of these proteins may be effected by an eluent within the range of compositions disclosed hereinabove, taking into account those more strongly adsorbed generally require more stringent conditions for complete elution.

EXAMPLE 14

Vasopressin (MW 1055) is a polypeptide hormone obtained by extraction from the posterior pituitary gland. A solution of this hormone from swine, containing 2.04 mg. of biuret-determinable protein in 5 ml. of distilled water, was shaken with 50 mg. of Resin B for 24 hr. The resin was then placed in a six mm. diameter column and washed with seven volumes of water. The effluent from the column contained 0.15 mg. biuret-determinable protein. The column was then eluted with 10 ml. of 1-to-1 ethanol/water solution containing 5.66% NaCl. By biuret determination, the eluate contained 1.76 mg. protein, indicating a recovery of 93% of the adsorbed protein.

EXAMPLE 15

Adrenocorticotrophic hormone (ACTH, MW 20,000, pI 4.7) in an amount corresponding to 6.1 mg. of biuret-determinable protein was dissolved in 5 ml. of distilled water. This solution was loaded onto a column comprising 50 mg. of Resin B, as in Example 14. The effluent from the column contained about half the protein, so that one-half was adsorbed on the resin. Upon elution with the eluent of Example 14, all of the protein loaded onto the column was recovered.

EXAMPLE 16

Resin A (1 g.) was added to 40 ml. of 0.00625 normal NaOH. Insulin (pancreatic hormone, MW 6,000) was then added (200 mg.), stirred for 7 hr., and permitted to sit overnight. The resin was then transferred to a 9 mm. diameter column and washed. Biuret analysis of the effluent showed that 160 mg. of insulin had been adsorbed. The column was eluted with 50 ml. of 50% aqueous methanol, 0.05 molar in $Na_2HPO_4$. Analysis of the eluate showed that 116 mg. of insulin had been recovered, or 72% of the insulin adsorbed.

EXAMPLE 17

Cytochrome C (MW 13,000, pI 10.65) is a heme pigment consisting of proteins bound to a porphyrin heme fragment. The heme unit leads to high UV absorption values at 550 m$\mu$, which gives a bright red solution.

Cytochrome C (200 mg.) was dissolved in 40 ml. of 0.1875 molar NaCl and shaken for 25 hr. with 1 g. of preconditioned Resin B. The liquid phase was then colorless, indicating complete adsorption of the Cytochrome C, which corresponded to 102 AU.

The mixture was then transferred to a column 9 mm. in diameter. The heme pigment was eluted from the column with 35 ml. of an ethanol/water 1-to-1 mixture, containing 5.66% NaCl. The eluent contained 100 AU, most of it in the first 25 ml. of eluate, thereby giving a recovery of 98%.

EXAMPLE 18

Chondroitin sulfate is a mucopolysaccharide containing protein attached to a sulfated polysaccharide backbone, and is representative of the class of animal polysaccharides. When a solution of chondrotin sulfate was stirred with Resin B none of it was adsorbed, as shown by analysis with Toluidine Blue O.

This shows that mixtures containing mucopolysaccharides along with proteins can be treated according to the present invention without interference from this common class of compounds.

We claim:
1. A method for separating a polypeptide from an aqueous fluid, which comprises
   contacting (i) an aqueous fluid containing a polypeptide with (ii) a macroreticular resin having a surface area at least about 10 square meters per gram, a porosity at least about 35 volume percent, and average pore diameters between about 0.001 and 1 micron to effect adsorption of said polyeptide onto said macroreticular resin, and then
   separating said aqueous fluid and said macroreticular resin from mutual contact, and then
   contacting said macroreticular resin with (iii) an eluent consisting essentially of a mixture of water, a miscible low molecular weight organic solvent, and an ionizable salt or buffer soluble in the water/solvent mixture, wherein said eluent contains between about 25 and 70 volume percent organic solvent and between about .02 to 2 molar ionizable salt or buffer, to elute said polypeptide from said macroreticular resin.
2. The method of claim 1, wherein said macroreticular resin consists essentially of (1) a copolymer of divinylbenzene with styrene, ethylstyrene or mixtures thereof, or (2) a copolymer of trimethylolpropane trimethacrylate and trimethylolpropane dimethacrylate.
3. The method of claim 2, wherein said macroreticular resin has a surface area at least about 200 square meters per gram, a porosity between about 40 and 75 volume percent, average pore diameters between about 0.01 and 1 micron, and at least 50% volume expansion when placed in methanol, and wherein said macroreticular resin consists essentially of a copolymer having cross-linked macromolecules comprising (a) at least about 30% divinylbenzene units along with ethylstyrene units, styrene units, or mixtures thereof, or (b) at least about 90% trimethylolpropane trimethylacrylate units along with trimethylolpropane dimethacrylate.
4. The method of claim 1, further comprising the step of washing said macroreticular resin with a solution consisting essentially of water and less than about 5% of a salt after said resin has been contacted with said aqueous fluid but before said macroreticular resin has been contacted with said eluent.
5. The method of claim 4, further comprising the step of storing said resin in contact with said washing solution before elution.

6. The method of claim 4, wherein the temperature is below about 10° C. during the steps of contacting said aqueous fluid and said macroreticular resin and of washing said macroreticular resin.

7. The method of claim 1, further comprising the step of drying said macroreticular resin after said resin has been contacted with said aqueous fluid but before said macroreticular resin has been contacted with said eluent.

8. The method of claim 1, further comprising the step of volatilizing said organic solvent after elution.

9. The method of claim 1, wherein said organic solvent is methanol, ethanol, 1-propanol, 2-propanol, acetone, acetonitrile, nitromethane, ethylene glycol, or a mixture thereof.

10. The method of claim 1, wherein said ionizable salt or buffer is LiCl, NaCl, $CaCl_2$, KCl, $Na_3PO_4$, $KH_2PO_4$, $Na_2HPO_4$, $Na_2SO_4$, benzyltriethylammonium chloride, octylphenoxyethoxyethyldimethylammonium chloride, sodium acetate, sodium citrate, or a mixture thereof.

11. The method of claim 1, wherein said aqueous fluid is a culture medium or nutrient broth containing a bacterium, fungus or yeast.

12. The method of claim 1, wherein said aqueous fluid is blood or a component thereof, urine, sap, saliva, gastric juice, or glandular secretions.

13. The method of claim 1, wherein said aqueous fluid is an extract from disintegrated cells.

14. The method of claim 1, wherein said aqueous fluid is a reaction mixture which contains a polypeptide.

15. The method of claim 1, further comprising the step of separating particulate matter from said aqueous fluid before contacting it with said macroreticular resin.

16. The method of claim 1, wherein said polypeptide is a protein.

17. The method of claim 16, wherein said protein is an enzyme.

18. The method of claim 1, wherein said polypeptide is a hormone.

19. The method of claim 1, wherein said polypeptide is a heme pigment.

References Cited

UNITED STATES PATENTS 3,418,262  12/1968  Weiotte et al. _____ 260—2.2
3,036,960   5/1962  Tallouette _____ 195—66

LIONEL M. SHAPIRO, Primary Examiner

W. A. SIMONS, Assistant Examiner